US008059176B2

(12) United States Patent
Ikehata

(10) Patent No.: US 8,059,176 B2
(45) Date of Patent: Nov. 15, 2011

(54) LINEAR IMAGE SENSOR

(75) Inventor: Yoshiyuki Ikehata, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 371 days.

(21) Appl. No.: 11/968,212

(22) Filed: Jan. 2, 2008

(65) Prior Publication Data

US 2008/0211953 A1 Sep. 4, 2008

(30) Foreign Application Priority Data

Jan. 12, 2007 (JP) ................................. 2007-004587

(51) Int. Cl.

| | |
|---|---|
| ***H04N 9/083*** | (2006.01) |
| ***H04N 3/14*** | (2006.01) |
| ***H04N 5/335*** | (2011.01) |
| ***H04N 9/04*** | (2006.01) |

(52) U.S. Cl. ......... 348/280; 348/321; 348/323; 348/324

(58) Field of Classification Search .................. 348/280, 348/320–324

See application file for complete search history.

(56) References Cited

U.S. PATENT DOCUMENTS

| | | | | |
|---|---|---|---|---|
| 5,767,901 A * | 6/1998 | Kimura | ......................... | 348/272 |
| RE37,378 E * | 9/2001 | Nagano | ......................... | 358/445 |
| 6,717,617 B1 * | 4/2004 | Ozono | ......................... | 348/324 |
| 7,358,997 B2 * | 4/2008 | Angal et al. | ......................... | 348/323 |
| 2004/0169765 A1 * | 9/2004 | Nakata et al. | ......................... | 348/345 |

FOREIGN PATENT DOCUMENTS

| | | |
|---|---|---|
| JP | 5-68140 | 3/1993 |
| JP | 8-274294 | 10/1996 |
| JP | 2001244448 | 9/2001 |
| JP | 2003110803 | 4/2003 |
| JP | 2006-50101 | 2/2006 |
| JP | 2006041918 | 2/2006 |

OTHER PUBLICATIONS

Japanese Official Action in corresponding Japanese application dated Aug. 3, 2010, with English language translation of pertinent portion indicated by a wavy line.

* cited by examiner

*Primary Examiner* — Anthony J Daniels

(74) *Attorney, Agent, or Firm* — Young & Thompson

(57) ABSTRACT

A linear image sensor with low noise and low power consumption comprises both high and low resolution analog shift registers for each photocell array. Noise in the output signals is decreased by driving either the low resolution analog shift register or the high resolution analog shift register depending on a required resolution. The power consumption of the linear image sensor is decreased because a charge detector receives charges from the high and low resolution analog shift registers.

9 Claims, 2 Drawing Sheets

LINEAR IMAGE SENSOR

RELATED APPLICATION

This application is based upon and claims the benefit of the priority of Japanese patent application No. 2007-004587, filed on Jan. 12, 2007, the disclosure of which is incorporated herein in its entirety by reference thereto.

FIELD OF THE INVENTION

The present invention relates to a linear image sensor and more specifically to a linear image sensor with a plurality of analog shift registers.

BACKGROUND OF THE INVENTION

There is increasing demand for a color linear image sensor to scan color images because of the recent spread of personal computers and demand for high performance copying machines.

A color linear image sensor usually comprises three linear image sensors disposed in parallel, each having a photocell array to convert received photons into electrons and CCD analog shift registers (hereafter called "analog shift registers") to transfer the electrons converted from photons in each photocell. Each photocell array is covered with one of different color filters (for example, red, green and blue filters). Hereafter, RE, GR and BL denote red, green and blue respectively.

Analog shift registers disposed between photocell arrays separate them at a constant distance.

When the color linear image sensor is employed in a scanner or a copying machine, the scan direction is perpendicular to the direction of photocell array in the three linear image sensors. We assume that objects are scanned by the color linear image sensor in RE, GR, BL order. To obtain color data (for example RGB values) of a predetermined point on an object, data scanned by the first and second linear image sensors must be stored in an external memory until the third linear image sensor scans the point. Only when scanning by these three sensors has been done, data scanned by them can be processed. If the distance between the two photocell arrays (hereafter called "line spacing") is wide, a large-capacity external memory is required to store the color data and the color data tends to be affected by the mechanical misalignment of the photocell arrays.

Both the line spacing and the time from the first scan to the third scan must be decreased to solve these problems. With this purpose, an arrangement explained in the following as a comparative example (Patent Document 1) has been employed.

To extend both signal output period and reference period of a linear images sensor in low resolution mode, a method of changing the timing to input charges to the charge detector is disclosed in Patent Document 2. A method for accelerating readout speed of a linear image sensor in low resolution mode is also disclosed in Patent Document 3.

[Patent Document 1]

Japanese Patent Kokai Publication No. JP-A-8-274294

[Patent Document 2]

Japanese Patent Kokai Publication No. JP-P2006-050101A

[Patent Document 3]

Japanese Patent Kokai Publication No. JP-A-5-068140

SUMMARY OF THE DISCLOSURE

In the following analysis on the related art is given by the present invention. The entire disclosures of the above mentioned Patent Documents are incorporated herein by reference thereto.

A linear image sensor with a small distance between two photocell arrays (hereafter called "line spacing L1") is disclosed (See FIG. 1 in Patent Document 1) to decrease the memory capacity to store scanned data and avoid the mechanical misalignment between the photocell arrays. Each element of the linear image sensor is described in the following.

Each photocell array 101*a*, 101*b*, or 101*c* is a photodetector for converting received photons into electrons. The number of photocells varies depending on the resolution in the main scan direction. RE, GR and BL photocell arrays are denoted by 101*a*, 101*b* and 101*c* respectively in FIG. 1.

Each transfer gate 102*a*, 102*b*1, 102*b*2, 102*c* transfers electrons converted from photons in each photocell into one corresponding stage of analog shift registers.

Each first analog shift register 103*a*, 103*b* or 103*c* transfers electrons from odd photocells. The count of stages in each analog shift registers is half the number of photocells in the main scan direction.

Each second analog shift register 104*a*, 104*b* or 104*c* transfers signal from even photocells. The count of stages in each analog shift register is half the number of photocells in the main scan direction.

Each charge detector 105*a*1, 105*a*2, 105*b*1, 105*b*2, 105*c*1 or 105*c*2, connected to one of the analog shift registers, converts the charge transferred successively with the analog shift registers into a voltage.

Each output amplifier 106*a*1, 106*a*2, 106*b*1, 106*b*2, 106*c*1, and 106*c*2, connected to one of the charge detectors, amplifies a voltage converted from charges at the charge detectors. There amplifiers are each disposed per each of the analog shift registers (or the charge detector).

In the central GR linear image sensor, a photocell array 101*b* is placed between analog shift registers 102*b*1 and 102*b*2. In the RE linear image sensor, analog shift registers are at one side of the color linear image sensor. In the BL linear image sensor, analog shift registers are at another side of the color linear image sensor. Since the arrangement of the photocell array and the analog shift registers for the central linear image sensor is different from those for the outside linear image sensors, both the line spacing L1 between the photocell arrays 101*a* and 101*b* and the line spacing L1 between the photocell arrays 101*b* and 101*c* can be reduced.

The number of charge detectors 105*a*1, 105*a*2, 105*b*1, 105*b*2, 105*c*1, and 105*c*2, and the number of the output amplifiers 106*a*1, 106*a*2, 106*b*1, 106*b*2, 106*c*1, and 106*c*2 are the same with the number of the analog shift registers. Each output amplifier is connected to one corresponding charge detector which is connected to one corresponding analog shift register. The number of stages in each analog shift register is half the total number of the photocells in the photocell array.

The operation of the linear image sensor comprises the following steps. When the transfer gate 102*a* is switched on, charge stored in each odd photocell 101*a* is transferred to the analog shift register 103*a* and charge stored in each even photocell 101*a* is transferred to the analog shift register 104*a*. Each analog shift register 103*a*, 104*a* transfers the received charge to one of charge detectors 105*a*1 and 105*a*2. Each charge detector 105*a*1, 105*a*2 converts the charge into a voltage. Each output amplifier 106*a*1, 106*a*2 amplifies the voltage. Each output node 107*a*1, 107*a*2 outputs the voltage, resulting in an add photocell signal and an even photocell signal independently of each other for one color concerned.

In the comparative color linear image sensor, the arrangement of the photocell array and the analog shift registers is different in each linear image sensor to reduce the line spacing L1. Therefore, it is difficult to realize a single pattern where the charge detector in each linear image sensor receives charges from the first and second analog shift registers. Each analog shift register in the comparative color linear image sensor is connected to one corresponding charge detector and one corresponding output amplifier. The output signal for odd photocells is synthesized with the charge detector 105*a*1 and the output amplifier 106*a*1, while the output signal for even photocells is synthesized with the charge detector 105*a*2 and the output amplifier 106*a*2. The effect of process variation and stray noise on the signal from odd photocells is different from that on the signal from even photocells, which causes differences between the characteristics of the signals from even photocells and that from odd photocells. Moreover, the power consumption of the comparative color linear image sensor is high, because it comprises as many as six output amplifiers.

Since output signal of even photocells is generated independently from that of odd photocells, they must be processed outside the linear image sensor to produce a low resolution output. Accordingly, it is difficult for the comparative linear image sensors to provide a low resolution output, without a pixel defect, as can be given by the sum of signals from neighboring even and odd photocells. Thus there is much desired in the art.

According to a first aspect of the present invention, there is provided a linear image sensor, comprising: a row of photocells, each converting photons into electrons; a first analog shift register and a second analog shift register, each provided with a plurality of stages, and disposed in parallel with the row of photocells so as to receive charge from the row of photocells for transferring the charge in a direction of the row of photocells; wherein each stage of the first analog shift register is so formulated as to receive charge from one corresponding photocell in the row of photocells; and each stage of the second analog shift register is so formulated as to receive charges from a plurality of photocells (e,g., neighboring or in any desired pattern) in the row of photocells; and wherein a first charge detector that receives charge from at least one of the first and second analog shift registers so as to convert the charge into a voltage; and either the first analog shift register or the second analog shift register is driven depending on a required resolution.

The meritorious effects of the present invention are summarized as follows. According to the present invention, a low resolution image without a pixel defect is produced with a linear image sensor, comprising a first analog shift register and a second analog shift register, each provided with a plurality of stages, wherein each stage of the first analog shift register is so formulated as to receive charge from one corresponding photocell; and each sage of the second analog shift register is so formulated as to receive charges from a plurality of neighboring photocells (two photocells for example).

Since the charge detector is shared between the high and low resolution analog shift registers, the number of output amplifiers can be reduced from two to one per photocell array. Therefore, the power consumption of the linear image sensor can be decreased.

Since both signals from even and odd photocells are output through the same charge detector and the same output amplifier, the signals are not affected by stray noise.

In the high resolution mode, only the first analog shift register is driven while the second analog shift register is not driven. On the contrary, in the low resolution mode, only the second analog shift register is driven while the first analog shift register is not driven. In this way, coupling noise at the charge detector can be reduced.

BRIEF DESCRIPTIONS OF THE DRAWINGS

PREFERRED MODES OF THE INVENTION

Preferred modes of the present invention are described with reference to the accompanying drawings.

[Mode 1]

According to the present invention, there is provided a linear image sensor, comprising: a row of photocells 1*a*, each converting photons into electrons; a first analog shift register 3*a* and a second analog shift register 4*a*, each provided with a plurality of stages, and disposed in parallel with the row of photocells 1*a* so as to receive charge from the row of photocells 1*a* for transferring the charge in a direction of the row of photocells 1*a*; wherein each stage of the first analog shift register 3*a* is so formulated as to receive charge from one corresponding photocell in the row of photocells 1*a*; and each stage of the second analog shift register 4*a* is so formulated as to receive charges from a plurality of neighboring photocells in the row of photocells 1*a*: and wherein a first charge detector 5*a* that receives charge from at least one of the first analog shift register 3*a* and the second analog shift register 4*a* so as to convert the charge into a voltage; and either the first analog shift register 3*a* or the second analog shift register 4*a* is driven depending on a required resolution.

Figure 1:
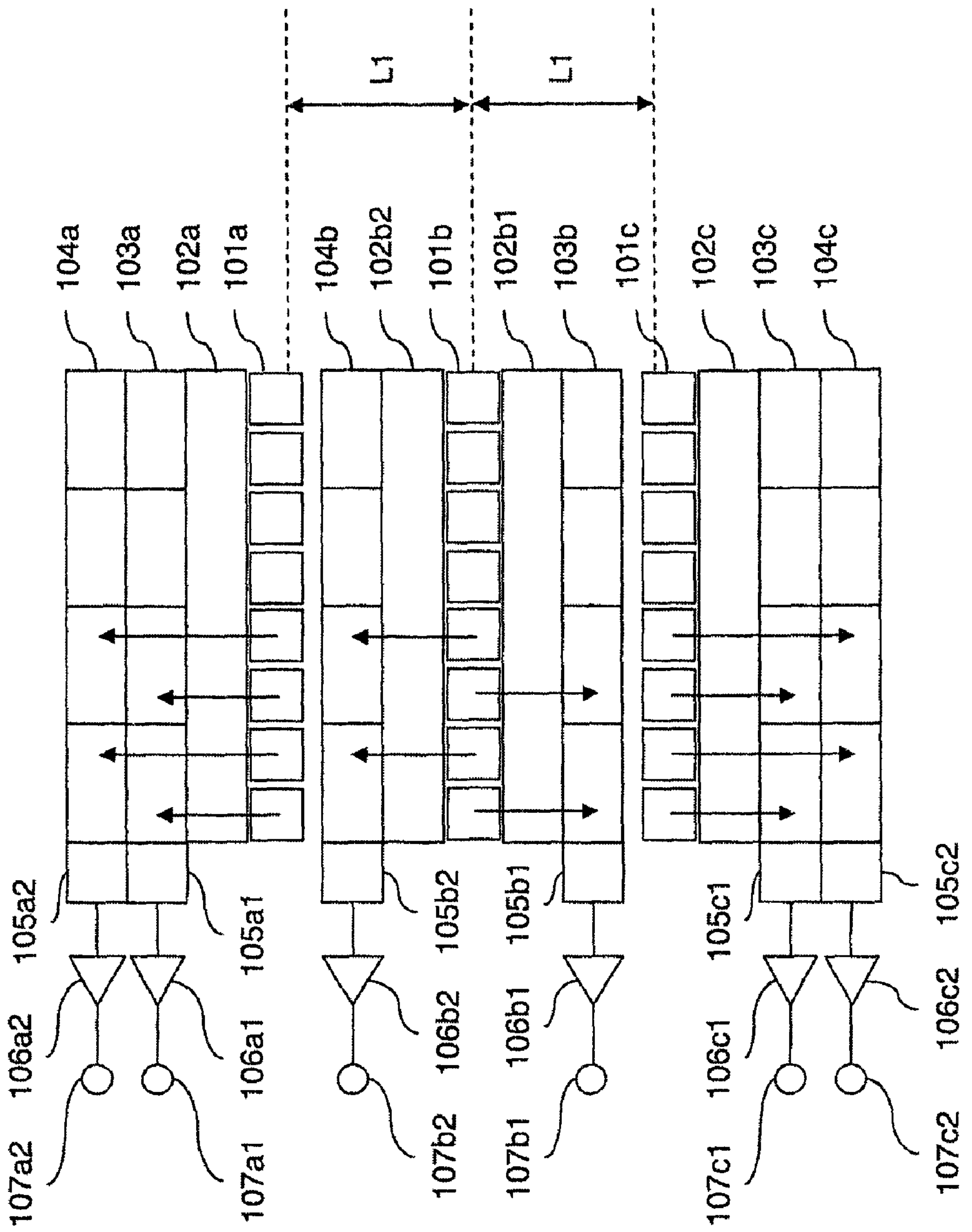
FIG. 1 shows a comparative color linear image sensor, as illustrated by the present invention for comparison.
Figure 2:
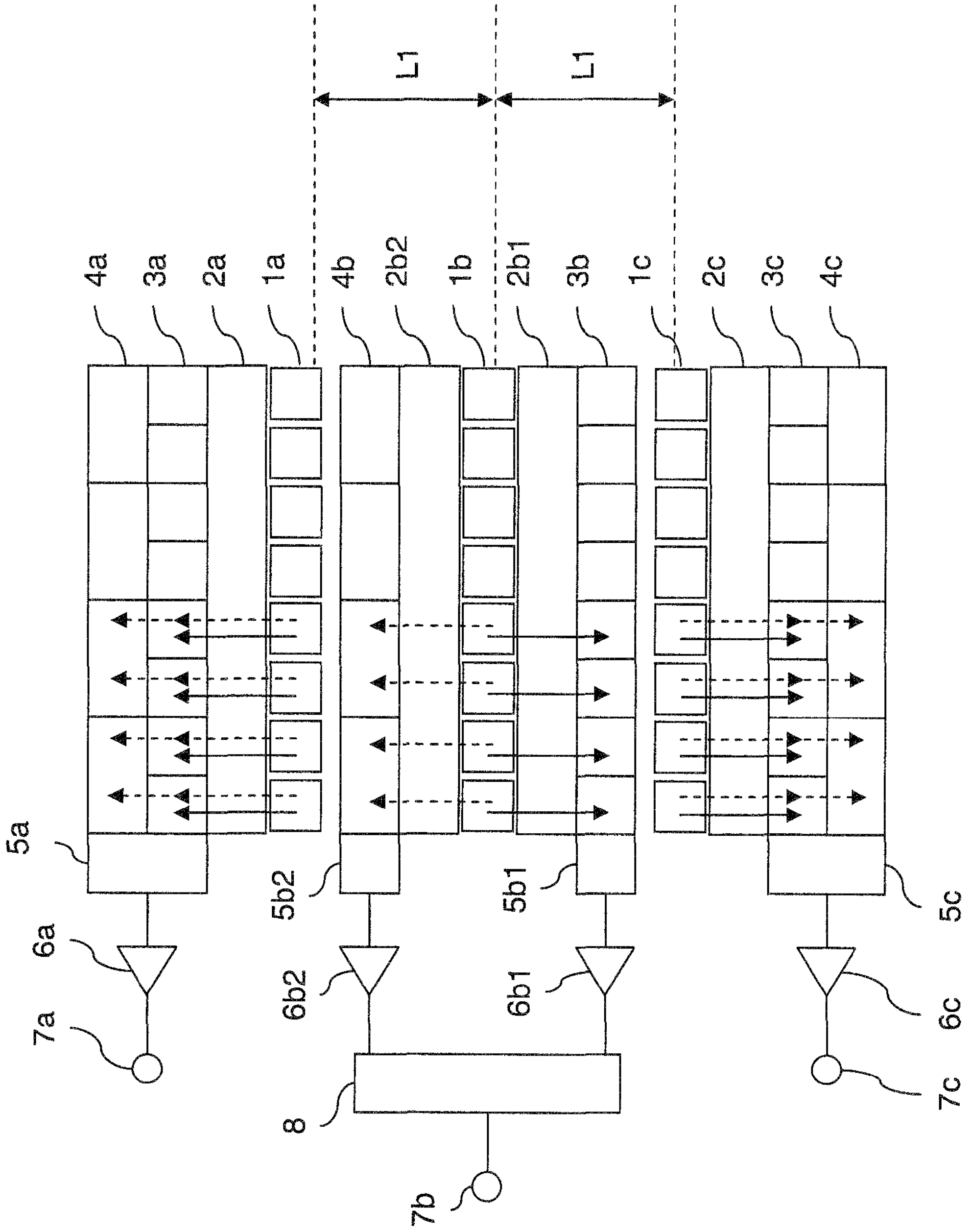
FIG. 2 shows a color linear image sensor according to an example of the present invention.

A voltage detector comprises a charge detector and an output amplifier (for example, 5*a* and 6*a* in FIG. 2).

[Mode 2]

There is also provided a linear image sensor, wherein the first charge detector 5*a* receives charges from the first analog shift register 3*a* and the second analog shift register 4*a*.

[Mode 3]

There is also provided a linear image sensor, further comprising: a second charge detector 5*b*2 that receives charge from the second analog shift register 4*b* and convert the charge into a voltage; and a second output amplifier 6*b*2 connected to the second charge detector 5*b*2; wherein a first charge detector 5*b*1 receives charge from the first analog shift register 3*b*.

[Mode 4]

There is provided a linear image sensor, wherein each stage in the second analog shift register 4*a* receives charges from neighboring photocells (e.g., neighboring two or more).

[Mode 5]

According to the present invention, there is provided a color linear image sensor, comprising: a first linear image sensor of mode 2, the first and second analog shift registers being disposed at one side of the color linear image sensor; a second linear image sensor of mode 2, the first and second analog shift registers being disposed at another side of the color linear image sensor; and a third linear image sensor of mode 3 placed in parallel between the first and second linear image sensors, the row of photocells being placed between the first and second analog shift registers.

[Mode 6]

There is also provided a color linear image sensor, according to mode 5, wherein each stage in the second analog shift register (4*a*, 4*b*, 4*c*) in the first, second and third linear image sensors receives charges from neighboring photocells (1*a*, 1*b*, 1*c* in FIG. 2) (e.g., neighboring two or more).

[Mode 7]

There is also provided a color linear image sensor, according to mode 5, further comprising: a switch 8 that receives an input signal either from a first or a second output amplifier of said third linear image sensor.

EXAMPLE 1

FIG. 2 shows a linear image sensor according to an example of the present invention. Each component of the image sensor is explained in the following.

Each photocell array 1*a*, 1*b*, 1*c* is a photodetector to convert incident photons into electrons. The number of photocells determines the resolution in the main scan direction. Here, 1*a*, 1*b* and 1*c* denote a red photocell array, a green photocell array, and a blue photocell array respectively.

Each transfer gate 2*a*, 2*b*1, 2*b*2 or 2*c* transfers electrons converted from photons in each photocell to one of analog shift registers.

The number of stages in each first analog shift register 3*a*, 3*b*, 3*c* used in the high resolution mode is same with the number of photocells in the photocell array.

The number of photocells in each second analog shift register 4*a*, 4*b*, 4*c* used in the low resolution mode is half the number of photocells in the photocell array.

A charge detector 5*a* receives charges from the first and second analog shift registers 3*a* and 4*a*.

A charge detector 5*b*1 detects charge from the first analog shift register 3*b*; a charge detector 5*b*2 detects charge from the second analog shift register 4*b*.

A charge detector 5*c* receives charges from the first and second analog shift registers 3*c* and 4*c*.

A switch 8 selects either a high or low resolution output. The switch 8 outputs a voltage from the output amplifier 6*b*1 in the high resolution mode and a voltage from the output amplifier 6*b*2 in the low resolution mode.

The color linear image sensor of the present example comprises a first analog shift register for the high resolution mode and a second analog shift register for the low resolution mode.

In the central linear image sensor for green GR, a photocell array 1*b* is placed between the first and second analog shift registers (3*b*, 4*b*). In the linear image sensor for red RE, the first and the second analog shift registers (3*a*, 4*a*) are at one side of the color linear image sensor. In the linear image sensor for blue BL, the first and the second analog shift registers (3*c*, 4*c*) are at another side of the color linear image sensor.

Each charge detector in the linear image sensors for RE and BL receives charges from the first and second analog shift registers.

Each charge detector in the central linear image sensor for GR receives charge from one corresponding analog shift register.

The operation of the color linear image sensor in the low and high resolution modes is described in the following.

The operation of the color linear image sensor in the high resolution mode is as follows. When transfer gates 2*a*, 2*b*1 and 2*c* are switched on, charge from each photocell is transferred through the transfer gates to one of first analog shift registers 3*a*, 3*b* and 3*c*. The charge movement is shown by solid arrows in FIG. 2. Each first analog shift register transfers the charge, each charge detector 5*a*, 5*b*1, 5*c* convert the charge into a voltage, and each output amplifier 6*a*, 6*b*1, 6*c* amplifies the voltage and each output node 7*a*, 7*b*, and 7*c* provides the amplified voltages, respectively. The switch 8 selects a voltage output from the output amplifier 6*b*1.

During the high resolution mode, each second analog shift register 4*a*, 4*b* or 4*c* is turned off to eliminate the effect of coupling noise from the clock which drives these analog shift registers.

The operation of the color linear image sensor in the low resolution mode is as follows. When the transfer gates 2*a*, 2*b*2 and 2*c* are switched on, each stage in the first analog shift register 3*a* and 3*c* receives charge from one of the photocell arrays 1*a* and lc. Each stage in the second analog shift registers 4*a* and 4*c* receives and adds charge from neighboring even and odd stages of the first analog shift registers 3*a* and 3*c* respectively to output a low resolution image without a pixel defect. Each stage in the second analog shift register 4*b* in the central linear image sensor directly receives charges from the neighboring even and odd photocells of the photocell array 1*b*. Each charge transferred by the analog shift registers 4*a*, 4*b* or 4*c* is converted into a voltage by one of the charge detectors 5*a*, 5*b*2 and 5*c*; each voltage is amplified by one of the output amplifiers 6*a*, 6*b*2 and 6*c* and output by one of the output nodes 7*a*, 7*b*, and 7*c*, respectively. The flow of the charges in the low resolution mode is shown by the broken arrows in FIG. 2.

The first analog shift registers 3*a*, 3*b* and 3*c* are turned off to eliminate the effect of coupling noise. Since the central linear image sensor has the charge detector 5*b*1 and the output amplifier 6*b*1 for the high resolution mode and the charge detector 5*b*2 and the output amplifier 6*b*2 for the low resolution mode, the switch 8 selects either a high resolution output from the output amplifier 6*b*1 or a low resolution output from the output amplifier 6*b*2.

Since each charge detector in the linear image sensors for RE and BL receives charges from the first and second analog shift registers, the number of output amplifiers can be reduced from 6 to 4. Accordingly the power consumption of the color linear image sensor is also reduced.

Since charges from even and odd photocells are added and output through the same charge detector and the output amplifier, stray noise does not cause differences between output characteristics from even photocells and that from odd photocells.

Since the color linear image sensor comprises not only the first analog shift registers but also the second analog shift registers receiving charges from neighboring even and odd photocells, it can produce a low resolution image without a pixel defect.

The analog shift registers for the low resolution mode are turned off in the high resolution mode, whereas the analog shift registers for the high resolution mode are turned off in the low resolution mode. Accordingly, the effect of stray noise (coupling or induced noise) at the charge detectors can be reduced.

According to the present example, there is provided a color linear image sensor with a plurality of photocell arrays to produce low and high resolution signals with low noise and low power consumption without changing the line spacing between the photocell arrays.

There is also provided a linear image sensor with a single photocell array (one of the outside linear image sensors of the present example) which produces low noise output in the low and high resolution at low power consumption.

Note that each stage of the second analog shift register may be so formulated as to receive charges from a plurality of photocells in any desired pattern, or ordering e.g., not only neighboring ones, but at every third or n-th photocell depending on the desired (changing) level (or rank) of the resolution.

Also, the second analog shift register may be so formulated as to receive charges from neighboring two or more photocells.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A linear image sensor device, comprising:
   first to third image sensors, said first image sensor being disposed at a first side of said second image sensor, said third image sensor being disposed at a second side opposite to said first side of said second image sensor,
   wherein said first image sensor comprising:
      a first row of photocells;
      a first shift register disposed at a side, opposite to said second image sensor, of said first row of photocells, said first shift register being provided with a plurality of stages so as to receive charges from one corresponding photocell in said first row of photocells through a first switchable transfer gate disposed between said first shift register and said first row of photocells;
      a second shift register disposed at a same side, opposite to said second image sensor, of said first row of photocells, said second shift resister being provided with a plurality of stages so as to receive charges from a plurality of photocells in said first row of photocells through the first switchable transfer gate; and
      a first charge detector receiving said charges from at least one of said first and second shift registers so as to convert said charges into a voltage, wherein said second image sensor comprising:
      a second row of photocells;
      a third shift register disposed at a first side of said second row of photocells, said third shift register being provided with a plurality of stages so as to receive charges from one corresponding photocell in said second row of photocells through a second switchable transfer gate disposed between said third shift register and said second row of photocells;
      a fourth shift register disposed at a second side, opposite to said first side, of said second row of photocells, said fourth shift resister being provided with a plurality of stages so as to receive charges from a plurality of photocells in said second row of photocells through a third switchable transfer gate disposed between said fourth shift register and said second row of photocells;
      a second charge detector receiving said charges from said third shift register so as to convert said charges into a voltage; and
      a third charge detector receiving said charges from said fourth shift register so as to convert said charges into a voltage, wherein said third image sensor comprising:
      a third row of photocells;
      a fifth shift register disposed at a side, opposite to said second image sensor, of said third row of photocells, said fifth shift register being provided with a plurality of stages so as to receive charges from one corresponding photocell in said third row of photocells through a fourth switchable transfer gate disposed between said fifth shift register and said third row of photocells;
      a sixth shift register disposed at a same side, opposite to said second image sensor, of said third row of photocells, said sixth shift resister being provided with a plurality of stages so as to receive charges from a plurality of photocells in said third row of photocells through the fourth switchable transfer gate; and
      a fourth charge detector receiving said charges from at least one of said fifth and sixth shift registers so as to convert said charges into a voltage, and
   wherein said first to sixth shift registers are driven depending on a required resolution.

2. The linear image sensor device according to claim 1, wherein said first, third and fifth shift registers are driven in a high resolution mode, and said second, fourth and sixth shift registers are driven in a low resolution mode.

3. The linear image sensor device according to claim 2, wherein said second charge detector is driven in a high resolution mode, and said third charge detector is driven in a low resolution mode.

4. The linear image sensor device according to claim 1, further comprising:
   a first output amplifier connected to said first charge detector;
   a second output amplifier connected to said second charge detector;
   a third output amplifier connected to said third charge detector;
   a fourth output amplifier connected to said fourth charge detector.

5. The linear image sensor device according to claim 4, further comprising:
   a switch selecting one of a signal from said second output amplifier and a signal from said third output amplifier.

6. The linear image sensor device according to claim 1, wherein each stage of said second, fourth and sixth shift registers is so formulated as to receive said charges from a plurality of neighboring photocells in corresponding one of first to third row of photocells, respectively.

7. The linear image sensor according to claim 6, wherein each stage of said second, fourth and sixth shift registers receives said charges from neighboring two photocells, respectively.

8. The linear image sensor according to claim 6, wherein said second image sensor processes green light, and first image sensor processes red light, and said third image sensor processes blue light.

9. The linear image sensor according to claim 6, wherein said second image sensor processes green light, and first image sensor processes blue light, and said third image sensor processes red light.

* * * * *